(12) United States Patent
Shibata

(10) Patent No.: US 12,025,509 B2
(45) Date of Patent: Jul. 2, 2024

(54) TEMPERATURE MEASUREMENT CIRCUIT AND TEMPERATURE MEASUREMENT DEVICE

(71) Applicant: Kohei Shibata, Tokyo (JP)

(72) Inventor: Kohei Shibata, Tokyo (JP)

(73) Assignee: MITSUMI ELECTRIC CO., LTD., Tokyo (JP)

(\*) Notice: Subject to any disclaimer, the term of this patent is extended or adjusted under 35 U.S.C. 154(b) by 429 days.

(21) Appl. No.: 17/646,028

(22) Filed: Dec. 27, 2021

(65) Prior Publication Data

US 2022/0214228 A1 Jul. 7, 2022

(30) Foreign Application Priority Data

Jan. 7, 2021 (JP) ................... 2021-001307

(51) Int. Cl.
*G01K 7/25* (2006.01)
*G01K 3/00* (2006.01)

(52) U.S. Cl.
CPC ............. *G01K 7/25* (2013.01); *G01K 3/005* (2013.01)

(58) Field of Classification Search
CPC ....................................................... G01K 7/25
USPC ....................................................... 327/512
See application file for complete search history.

(56) References Cited

U.S. PATENT DOCUMENTS

2015/0219503 A1 8/2015 Yoshida
2019/0242759 A1 8/2019 Hikosaka

FOREIGN PATENT DOCUMENTS

| JP | S62-024333 U | 2/1987 | |
|---|---|---|---|
| JP | 2007-183113 | 7/2007 | |
| JP | 2011-524006 | 8/2011 | |
| JP | 2015-145823 | 8/2015 | |
| JP | 2018-077134 | 5/2018 | |
| WO | 2009/145629 | 12/2009 | |
| WO | WO-2009145629 A1 * | 12/2009 | ............... G01K 7/25 |

OTHER PUBLICATIONS

Office Action mailed on Feb. 22, 2022 with respect to the corresponding Japanese patent application No. 2021-001307.

\* cited by examiner

*Primary Examiner* — Tomi Skibinski
(74) *Attorney, Agent, or Firm* — IPUSA, PLLC

(57) ABSTRACT

A temperature measurement circuit for measuring a temperature using a temperature sensitive element includes a voltage control circuit configured to apply a control voltage to the temperature sensitive element. The temperature measurement circuit includes a first switching circuit configured to switch levels of the control voltage based on a current flowing through the temperature sensitive element. The temperature measurement circuit includes a conversion circuit configured to convert the current flowing through the temperature sensitive element into a voltage level corresponding to the measured temperature, by using predetermined conversion gain. The temperature measurement circuit includes a second switching circuit configured to switch values of the conversion gain based on the voltage level.

20 Claims, 6 Drawing Sheets

FIG.2

| BIT1 | L | H | L | H |
|---|---|---|---|---|
| BIT2 | L | L | H | H |
| n | 1 | a | b | a×b |

TEMPERATURE MEASUREMENT CIRCUIT AND TEMPERATURE MEASUREMENT DEVICE

CROSS-REFERENCE TO RELATED APPLICATION

This application claims priority under 35 U.S.C. § 119 to Japanese Patent Application No. 2021-1307, filed Jan. 7, 2021, the contents of which are incorporated herein by reference in their entirety.

BACKGROUND

1. Field of the Invention

The present disclosure relates to a temperature measurement circuit and a temperature measurement device.

2. Description of the Related Art

Temperature detecting devices are known in which a thermistor and a voltage divider are coupled in series and a temperature is detected based on an output voltage at a connection point of the thermistor and the voltage divider. In such a temperature detecting device, when the thermistor operates in a low resistance range, increases in the current flowing through the thermistor may be mitigated by reducing a supply voltage to the thermistor (see, for example, Patent Document 1).

CITATION LIST

[Patent Document]
Patent Document 1: Japanese Unexamined Patent Application Publication No. 2015-145823

SUMMARY

In the technique described in Patent Document 1, when the thermistor operates in the low resistance range, a resistance value of the voltage divider coupled in series with the thermistor is reduced, and thus the current flowing through the thermistor is increased. For example, the increased current to flow through the thermistor may result in increased power consumption. Also, the temperature detecting device described in Patent Document 1 employs a system that detects changes in the voltage that is divided through the thermistor and the voltage divider, and thus a voltage divider constant needs to be changed in accordance with a constant of a used temperature sensitive element, such as the thermistor. Therefore, unless the voltage divider constant is changed, it may be difficult to sufficiently deal with a wide range of temperature sensitive element constants (nominal values of resistance).

The present disclosure provides a temperature measurement circuit and a temperature measurement device that is applicable to a wide range of temperature sensitive element constants.

According to a first aspect of the present disclosure, a temperature measurement circuit for measuring a temperature using a temperature sensitive element is provided. The temperature measurement circuit includes a voltage control circuit configured to apply a control voltage to the temperature sensitive element. The temperature measurement circuit includes a first switching circuit configured to switch levels of the control voltage based on a current flowing through the temperature sensitive element. The temperature measurement circuit includes a conversion circuit configured to convert the current flowing through the temperature sensitive element into a voltage level corresponding to the measured temperature, by using predetermined conversion gain. The temperature measurement circuit includes a second switching circuit configured to switch values of the conversion gain based on the voltage level.

According to a second aspect of the present disclosure, a temperature measurement circuit for measuring a temperature using a temperature sensitive element is provided. The temperature measurement circuit includes a transistor for driving the temperature sensitive element. The temperature measurement circuit includes a differential circuit configured to compare an output voltage of the transistor against a reference voltage. The temperature measurement circuit includes a voltage control circuit configured to apply a control voltage to the temperature sensitive element by controlling a gate of the transistor based on an output of the differential circuit. The temperature measurement circuit includes a conversion circuit configured to convert an output current of the transistor into a voltage level corresponding to the measured temperature. The output voltage of the transistor is a voltage into which the output current of the transistor is converted based on a resistance value of the temperature sensitive element.

BRIEF DESCRIPTION OF THE DRAWINGS

FIG. 2 is a diagram illustrating an example of the relationship among first information BIT1, second information BIT2, and a coefficient n;

DESCRIPTION OF THE EMBODIMENTS

One or more embodiments of the present disclosure will be described with reference to the drawings.

Figure 1:
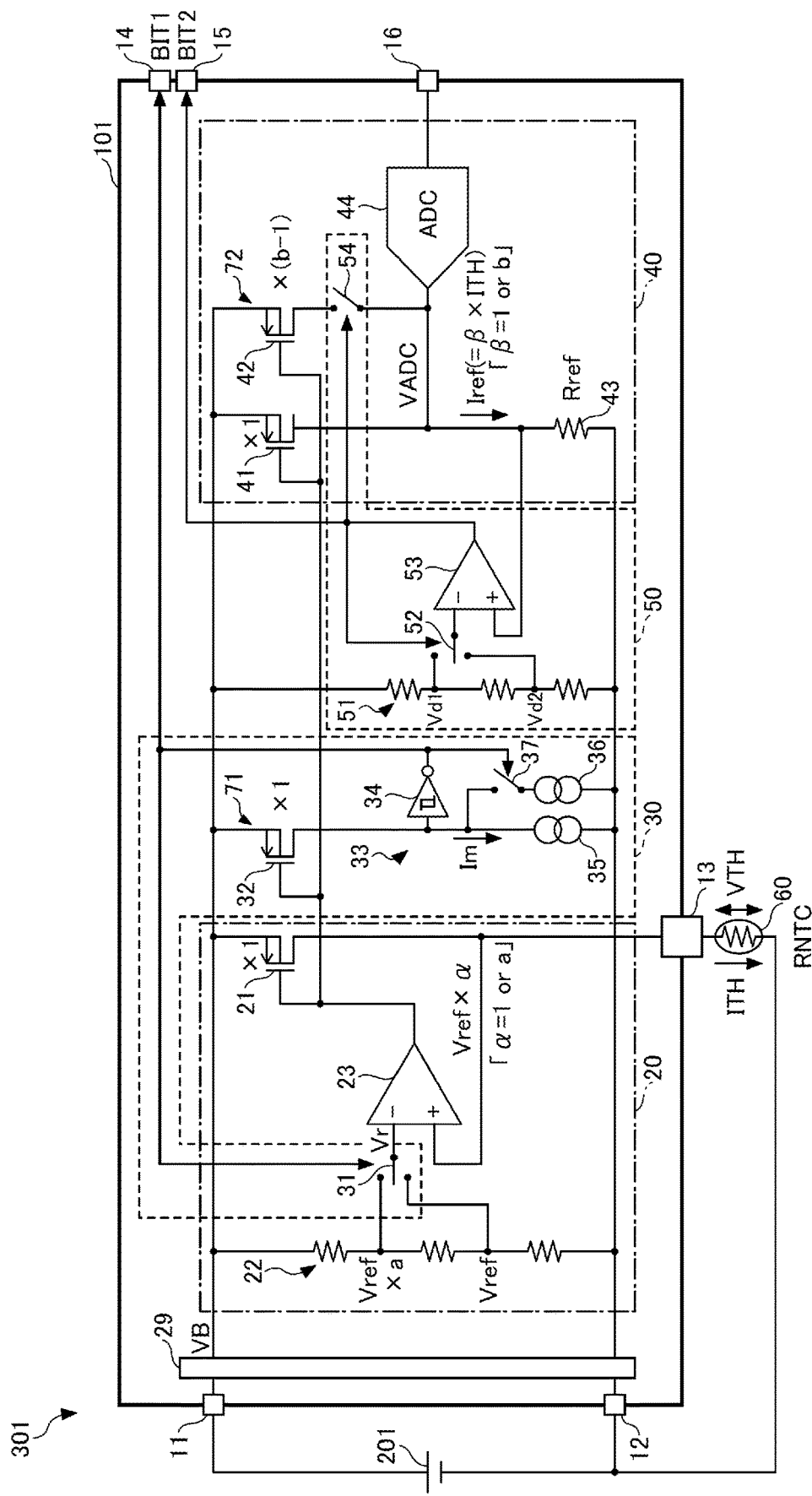
FIG. 1 is a diagram illustrating an example of the configuration of a temperature measurement device including a temperature measurement circuit according to one embodiment.

FIG. 1 is a diagram illustrating an example of the configuration of a temperature measurement device 301 including a temperature measurement circuit 101 according to one embodiment. The temperature measurement device 301 illustrated in FIG. 1 detects a temperature of a target object to be measured, by using a temperature sensitive element 60. The target object may include a solid, a liquid, or gas, and is not particularly limited to these examples. A specific example of the target object may include a secondary battery or the like. The temperature measurement device 301 includes the temperature sensitive element 60 and the temperature measurement circuit 101.

The resistance value of the temperature sensitive element 60 changes with changes in the temperature of the target object. For example, the temperature sensitive element 60 is a negative temperature coefficient (NTC) thermistor. The NTC thermistor is a resistance temperature detector of which a resistance value is changed based on a negative temperature characteristic.

The temperature measurement circuit 101 is a semiconductor integrated circuit that measures the temperature of the target object by using the temperature sensitive element 60. In this example, the temperature measurement circuit 101 includes terminals 11 to 16 used for an external connection with the temperature measurement circuit 101. The temperature measurement circuit 101 may be a single semiconductor integrated circuit that has a function of measuring temperatures, or may be a circuit that is a portion of a semiconductor integrated circuit that has a different function (for example, a function or the like of protecting a secondary battery) different from the function of measuring the temperatures.

A terminal 11 is a power supply terminal, and a terminal 12 is a ground terminal. A positive electrode of a power supply 201, such as a secondary battery, is electrically coupled to the terminal 11, and a negative electrode of the power supply 201 is electrically coupled to the terminal 12. The temperature measurement circuit 101 operates with a supply voltage that the power supply 201 applies between the terminal 11 and the terminal 12. For example, the temperature measurement circuit 101 operates with a voltage VB that a constant voltage source 29 such as a regulator generates. The constant voltage source 29 may be disposed within the temperature measurement circuit 101, or may disposed outside the temperature measurement circuit 101.

A terminal 13 is a temperature measurement terminal to which one end of the temperature sensitive element 60 is coupled. The one end of the temperature sensitive element 60 is coupled to the terminal 13, and another end of the temperature sensitive element 60 is coupled to the terminal 12.

A terminal 14 is a first output terminal for outputting first information BIT1 to outside of the temperature measurement circuit 101. The first information BIT1 changes in accordance with the level of a control voltage VTH that is applied to the temperature sensitive element 60. A terminal 15 is a second output terminal for outputting second information BIT2 to the outside of the temperature measurement circuit 101. The second information BIT2 changes in accordance with a value indicating conversion gain β described below. A terminal 16 is an output terminal for outputting a measurement value to the outside of the temperature measurement circuit 101. The measurement value is obtained by the temperature measurement circuit 101 that uses the temperature sensitive element 60.

The temperature measurement circuit 101 includes a voltage control circuit 20, a first switching circuit 30, a conversion circuit 40, and a second switching circuit 50.

The voltage control circuit 20 is a circuit that applies the control voltage VTH to the temperature sensitive element 60. In this example, with use of a gate of a transistor 21 that drives the temperature sensitive element 60, the voltage control circuit 20 applies the control voltage VTH to the temperature sensitive element 60. The voltage control circuit 20 applies the control voltage VTH across the temperature sensitive element 60, based on the output of a differential circuit 23 that compares the control voltage VTH against a reference voltage Vr. By applying the control voltage VTH between the terminal 13 and the terminal 12, the voltage control circuit 20 applies the control voltage VTH to the temperature sensitive element 60 of which both ends are coupled to the terminal 13 and the terminal 12. In this example, an output voltage of the transistor 21 is a voltage determined based on an output current of the transistor 21 and a resistance value RNTC of the temperature sensitive element 60. The output voltage corresponds to the control voltage VTH.

In the example in FIG. 1, the voltage control circuit 20 includes a reference voltage circuit 22, a differential circuit 23, and the transistor 21.

The reference voltage circuit 22 generates multiple reference voltages Vr each having a different voltage level. In this example, by dividing the supply voltage VB through a voltage divider that includes resistance of each of multiple resistors, the reference voltage circuit 22 generates two different reference voltages, i.e., a voltage level Vref and a voltage level Vref×a. The voltage level Vref is an example of a first voltage level, and the voltage level Vref×a is an example of a second voltage level that is greater than the first voltage level.

The "a" is a positive coefficient greater than 1. In this example, the coefficient "a" is determined by a ratio between resistance values of multiple resistors that are included in a voltage divider circuit of the reference voltage circuit 22. The voltage divider circuit in the reference voltage circuit 22 may include a trimmable resistor in order to adjust a value of the coefficient "a."

The differential circuit 23 controls a gate voltage for the transistor 21 such that a difference between the control voltage VTH and the reference voltage Vr is zero. The differential circuit 23 is an operational amplifier that includes, for example, (i) an inverting input to which the reference voltage Vr is applied, (ii) a non-inverting input to which the control voltage VTH is applied, and (iii) an output coupled to a gate of the transistor 21.

The transistor 21 is a semiconductor element that causes a current ITH to flow through the temperature sensitive element 60. In this example, the transistor 21 is a P-channel metal oxide semiconductor field effect transistor (MOSFET) that has an output terminal to be coupled to one end of the temperature sensitive element 60. The transistor 21 is, for example, a P-channel MOSFET that has (i) a gate coupled to an output of the differential circuit 23, (ii) a source coupled to the terminal 11, and (iii) a drain coupled to both of one end of the temperature sensitive element 60 and the non-inverting input of the differential circuit 23. In this case, the drain of the P-channel MOSFET corresponds to the output terminal of the transistor 21.

The first switching circuit 30 switches levels of the reference voltage VTH, based on the current ITH flowing through the temperature sensitive element 60. With this arrangement, the voltage control circuit 20 can selectively switch the levels of the control voltage VTH to be applied to the temperature sensitive element 60, based on the magnitude of the current ITH. In the example in FIG. 1, the first switching circuit 30 switches the levels of the control voltage VTH, by switching the levels of the reference voltage Vr based on the magnitude of the current ITH flowing through the transistor 21.

If the magnitude of the current ITH flowing through the transistor 21 is greater than a first current threshold I1, the first switching circuit 30 switches the levels of the reference voltage Vr such that the level of the control voltage VTH is reduced from the voltage level Vrefxa to the voltage level Vref. With this arrangement, even if the magnitude of the current ITH is increased due to reductions in the resistance value RNTC of the temperature sensitive element 60, the level of the control voltage VTH applied to the temperature sensitive element 60 is reduced, and thus the magnitude of the current ITH can be prevented from increasing excessively. In the example in FIG. 1, the first switching circuit 30 changes the level of the reference voltage Vr, from the voltage level Vrefxa to the voltage level Vref, through a switch 31, to thereby reduce the level of the control voltage VTH from the voltage level Vrefxa to the voltage level Vref.

In contrast, if the magnitude of the current ITH flowing through the transistor 21 is less than a second current threshold I2 less than the first current threshold I1, the first switching circuit 30 switches the levels of the reference voltage Vr such that the level of the control voltage VTH is increased from the voltage level Vref to the voltage level Vrefxa. With this arrangement, even if the magnitude of the current ITH is reduced due to increases in the resistance value RNTC of the temperature sensitive element 60, the level of the control voltage VTH to be applied to the temperature sensitive element 60 is increased, and thus the magnitude of the current ITH can be prevented from being reduced excessively. In the example in FIG. 1, the first switching circuit 30 changes the level of the reference voltage Vr from the voltage level Vrefxa to the voltage level Vref, through the switch 31, to thereby increase the level of the control voltage VTH from the voltage level Vref to the voltage level Vrefxa.

In the example in FIG. 1, the first switching circuit 30 includes the switch 31, the transistor 32, and a current detecting circuit 33.

In this example, in response to the current ITH flowing through the transistor 21, the first switching circuit 30 switches the levels of the reference voltage Vr based on a first mirror current Im output from a first current mirror circuit 71. Thus, the first switching circuit 30 switches the levels of the control voltage VTH output from the voltage control circuit 20. The first current mirror circuit 71 is a circuit that is constituted by the transistor 21 and the transistor 32. The first mirror current Im is output from the transistor 32, in response to the magnitude of the current ITH flowing through the transistor 21. In this example, a ratio (a mirror ratio for the first current mirror circuit 71) between the magnitude of the current ITH and the magnitude of the first mirror current Im is 1:1. Such a ratio is not limited to this example.

As described above, in response to the current ITH flowing through the transistor 21, the first switching circuit 30 switches the levels of the control voltage VTH based on the first current Im output from the first current mirror circuit 71. With use of a second current mirror circuit 72, the first switching circuit 30 can switch the levels of the control voltage VTH, without directly controlling the current ITH flowing through the temperature sensitive element 60. Thus, accuracy of the current ITH flowing through the temperature sensitive element 60 to which the control voltage VTH is applied can be ensured. Therefore, accuracy in measuring a given temperature by using the temperature sensitive element 60 is improved.

In the example in FIG. 1, the first switching circuit 30 shares the transistor 21 with the voltage control circuit 20. The transistor 21 is used as a drive transistor for passing the current ITH into the temperature sensitive element 60. The transistor 21 is also used as a detection transistor for detecting the magnitude of the current ITH. The transistor 21 functions as both the drive transistor and the detection transistor, and thus the temperature measurement circuit 101 can be made compact.

In this example, the transistor 32 is a p-channel MOSFET that has (i) a gate coupled to the gate of the transistor 21, (ii) a source coupled to the terminal 11, and (iii) a drain coupled to the current detecting circuit 33.

By monitoring the first mirror current Im, the current detecting circuit 33 detects the magnitude of the current ITH. Upon detecting that the magnitude of the current ITH flowing through the transistor 21 is greater than the first current threshold I1 by monitoring the first mirror current Im, the current detecting circuit 33 uses the switch 31 to change the level of the reference voltage Vr from the voltage level Vrefxa to the voltage level Vref. In contrast, upon detecting that the magnitude of the current ITH flowing through the transistor 21 is less than the second current threshold I2 by monitoring the first mirror current Im, the current detecting circuit 33 uses the switch 31 to change the level of the reference voltage Vr, from the voltage level Vref to the voltage level Vrefxa.

The current detecting circuit 33 includes a Schmitt trigger inverter 34, a first constant current source 35, a second constant current source 36, and a switch 37. The first current threshold I1 is set based on a total sum of the magnitude of a constant current delivered from the first constant current source 35, and the magnitude of a constant current delivered from the second constant current source 36.

A mirror ratio for the first current mirror circuit 71 is 1:1. If the magnitude of the current ITH (first mirror current Im) increases, an input voltage level of the Schmitt trigger inverter 34 increases. If the magnitude of the current ITH (first mirror current Im) exceeds the first current threshold I1, a logic level at the output of the Schmitt trigger inverter 34 is changed from a high level to a low level. With this arrangement, the switch 37 is changed from an on-state to an off-state, and the level of the reference voltage Vr is changed from the voltage level Vrefxa to the voltage level Vref, through the switch 31. As a result, a current threshold for the current detecting circuit 33 is changed from the first current threshold I1 to the second current threshold I2, and the level of the control voltage VTH is changed from the voltage level Vrefxa to the voltage level Vref. The current detecting circuit 33 outputs first information BIT1 at a low level to the outside of the temperature measurement circuit 101, through the terminal 14, and the first information BIT1 indicates that the level of the control voltage VTH is the voltage level Vref.

In contrast, if the magnitude of the current ITH (first mirror current Im) decreases, the input voltage level of the Schmitt trigger inverter 34 is reduced. If the magnitude of the current ITH (first mirror current Im) is less than the second current threshold I2, the logic level at the output of the Schmitt trigger inverter 34 is changed from the low level to the high level. With this arrangement, the switch 37 is changed from the off-state to the on-state, and the level of the reference voltage Vr is changed from the voltage level Vref to the voltage level Vrefxa, through the switch 31. As a result, the current threshold for the current detecting circuit 33 is changed from the second current threshold I2 to the first current threshold I1, and the level of the control voltage VTH is changed from the voltage level Vref to the voltage level Vref×a. The current detecting circuit 33 outputs first information BIT1 at a high level to the outside of the temperature measurement circuit 101, through the terminal 14, and the first information BIT1 indicates that the level of the control voltage VTH is the voltage level Vref×a.

With use of predetermined conversion gain β, the conversion circuit 40 converts the current ITH flowing through the temperature sensitive element 60, into a voltage level VADC corresponding to a measured temperature. In this example, in the conversion circuit 40, the second current mirror circuit 72 generates the voltage level VADC by performing conversion of the current ITH flowing through the transistor 21. The second current mirror circuit 72 is a circuit that is constituted by the transistor 21, the transistor 41, and the transistor 42.

In the conversion circuit 40, the second current mirror circuit 72 converts the current ITH flowing through the transistor 21, into a second mirror current Iref. Then, the conversion circuit 40 outputs an analog voltage indicative of the voltage level VADC, where the analog voltage is generated by passing the second mirror current Iref into a resistor 43. The conversion circuit 40 outputs a measurement value (voltage level VADC or a value corresponding to the voltage level VADC) to the outside of the temperature measurement circuit 101, through the terminal 16. With this arrangement, the temperature measurement circuit 101 can provide an external device of the temperature measurement circuit 101 with the measurement value corresponding to the temperature that is obtained using the temperature sensitive element 60. The second mirror current Iref is a reference current that flows through the resistor 43.

The conversion circuit 40 may include an AD converter 44 that performs an analog-to-digital (AD) conversion of an analog voltage level VADC into a digital measurement value, where the analog voltage level VADC is generated by passing the second mirror current Iref into the resistor 43. In this case, the conversion circuit 40 outputs the digital measurement value to the outside of the temperature measurement circuit 101, through the terminal 16. The digital measurement value is an example of a value corresponding to the voltage level VADC.

Instead of the AD converter 44, the conversion circuit 40 may include a comparator that compares the analog voltage level VADC against a predetermined determination value. In addition to outputting the first information BIT1 and the second information BIT2 through the terminals 14 and 15, respectively, the conversion circuit 40 can output the output of the comparator to the outside of the temperature measurement circuit 101, through the terminal 16, thereby providing the external device with an indication of whether a target voltage level exceeds the predetermined determination value (temperature). The output of the comparator is an example of a value corresponding to the voltage level VADC.

The external device uses the measurement value provided by the temperature measurement circuit 101, in order to enable a predetermined control. The predetermined control is not particularly limited. For example, the external device may correct a detected value indicative of a residual capacity the secondary battery, based on the measurement value, or may use the measurement value in order to protect the secondary battery against the temperature.

In the example illustrated in FIG. 1, the conversion circuit 40 includes the transistor 41, the transistor 42, the resistor 43, and the AD converter 44.

The conversion circuit 40 shares the transistor 21 with the voltage control circuit 20. The transistor 21 is used as a drive transistor for passing the current ITH into the temperature sensitive element 60. The transistor 21 is also used as a conversion transistor for converting the current ITH into the voltage level VADC. The transistor 21 functions as both the drive transistor and the conversion transistor, and thus the temperature measurement circuit 101 can be made compact.

In this example, the transistor 41 is a P-channel MOSFET that has (i) a gate coupled to the gate of the transistor 21, (ii) a source coupled to the terminal 11, and (iii) a drain coupled to the end of the resistor 43. In this example, the transistor 42 is a P-channel MOSFET that has (i) a gate coupled to a gate of the transistor 21, (ii) a source coupled to the terminal 11, and (iii) a drain coupled to an end of the resistor 43 via a switch 54.

The second switching circuit 50 switches values of conversion gain β for the conversion circuit 40, based on the voltage level VADC. With this arrangement, the conversion circuit 40 can selectively change the conversion gain β, based on the voltage level VADC. The second switching circuit 50 switches the values of the conversion gain β based on the voltage level VADC, such that the voltage level VADC is set within a predetermined range. Thus, the voltage level VADC can be changed within the predetermined range.

If the voltage level VADC exceeds a first threshold Vd1, the second switching circuit 50 changes the value of the conversion gain β to a first conversion gain value β1 (in this example, "1"). In contrast, if the voltage level VADC is less than a second threshold Vd2 less than the first threshold Vd1, the second switching circuit 50 changes the value of the conversion gain β to a second conversion gain value β2 (in this example, "b"). The value "b" is a positive coefficient greater than 1. In this example, the conversion gain β and coefficient b are each determined based on a mirror ratio for the second current mirror circuit 72.

In this example, the second switching circuit 50 switches the values of the conversion gain β, based on the voltage level VADC generated by the second current mirror circuit 72 that performs conversion of the current ITH flowing through the transistor 21. With use of the second current mirror circuit 72, the second switching circuit 50 can switch the values of the conversion gain β, without directly controlling the current ITH flowing through the temperature sensitive element 60. With this arrangement, accuracy of the current ITH flowing through the temperature sensitive element 60 that is applied to the control voltage VTH can be ensured. Therefore, accuracy in measuring the temperature by using the temperature sensitive element 60 is improved.

In the example illustrated in FIG. 1, the second switching circuit 50 includes a threshold generating circuit 51, a switch 52, a comparator 53, and the switch 54.

The threshold generating circuit 51 generates multiple thresholds Vd each indicating a different voltage level. In this example, the threshold generating circuit 51 generates two thresholds Vd, i.e., the first threshold Vd1 and the second threshold Vd2, by dividing the supply voltage VB through a voltage divider circuit that includes resistance of each of multiple resistors. A voltage level of the second threshold Vd2 is less than that of the first threshold Vd1.

The comparator 53 compares a threshold Vd against the voltage level VADC. Based on the result of the comparison, the comparator 53 turns the switch 54 on or off, and performs switching of the switch 52.

When detecting that the voltage level VADC exceeds the first threshold Vd1, the comparator 53 changes the value of the conversion gain β, from β2 (in this example, "b") to β1 (in this example, "1"), by turning the switch 54 off, and further changes the threshold Vd from Vd1 to Vd2, through the switch 52. The comparator 53 outputs second information BIT2 at a low level to the outside of the temperature measurement circuit 101, via the terminal 15. The second information BIT2 indicates that the value of the conversion gain β is the gain β1.

In contrast, when detecting that the voltage level VADC is less than the second threshold Vd2, the comparator 53 changes the value of the conversion gain β, from β1 (in this example, "1") to β2 (in this example, "b"), by turning the switch 54 on, and further changes the threshold Vd from Vd2 to Vd1, through the switch 52. The comparator 53 outputs second information BIT2 at a high level to the outside of the temperature measurement circuit 101. The second information BIT2 indicates that the value of the conversion gain β is the gain β2.

In this description, the following equations are given.

$$RNTC = VTH/ITH$$
$$= (Vref \times \alpha)/ITH$$
$$= (Vref \times \alpha) \times (\beta/Iref)$$
$$= (Vref \times \alpha) \times (\beta \times Rref/VADC)$$
$$= Rref \times Vref \times (n/VADC)$$

Where, RNTC is the resistance value of the temperature sensitive element 60, Vref×α is the level of the control voltage VTH applied to the temperature sensitive element 60, and ITH is the current flowing through the temperature sensitive element 60. Also, β×ITH is the magnitude of the second mirror current Iref flowing through the resistor 43, and Rref is the resistance value of the resistor 43. The coefficient n is a value obtained by α×β, α is 1 or a, and β is 1 or b.

Figure 2:
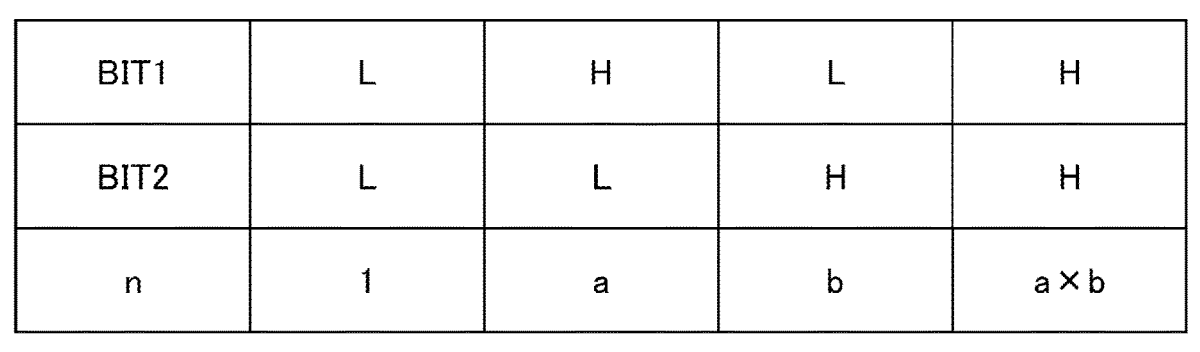

FIG. 2 is a diagram illustrating an example of the relationship among the first information BIT1, the second information BIT2, and the coefficient n. Where, L indicates a low level, and H indicates a high level. The external device compares, against a corresponding logic level in the relationship illustrated in FIG. 2, a logic level of each of the first information BIT1 and the second information BIT2, which is obtained from the temperature measurement circuit 101. Then, the external device determines the coefficient n in a given equation described above. The temperature measurement circuit 101 may provide the external device with information indicating the coefficient n.

The external device acquires a measurement value (voltage level VADC or a value corresponding to the voltage level VADC) from the temperature measurement circuit 101, and calculates the resistance value RNTC of the temperature sensitive element 60 by substituting the measurement value and the coefficient n into the above-described equation. The external device calculates a given temperature of the target object based on a calculated value of the resistance value RNTC. For example, the external device calculates the temperature (ambient temperature T) of the target object by substituting the calculated value of the resistance value RNTC into the equations below.

$$R = R_0 \times \exp(B \times (1/T - 1/T_0)) \quad (1a)$$

$$1/T = 1/B \times \ln(R/R_0) + 1/T_0 \quad (1b)$$

Where, T is ambient temperature (K), $T_0$ is a reference temperature (K), R is a resistance value (=RNTC) of the temperature sensitive element 60 at the ambient temperature T, $R_0$ is a resistance value of the temperature sensitive element 60 at the reference temperature $T_0$, and B is a constant.

Equation (1b) is an equation obtained by modifying Equation (1a). Also, $T_0$, $R_0$, and B are parameters for the temperature sensitive element 60.

Figure 3:
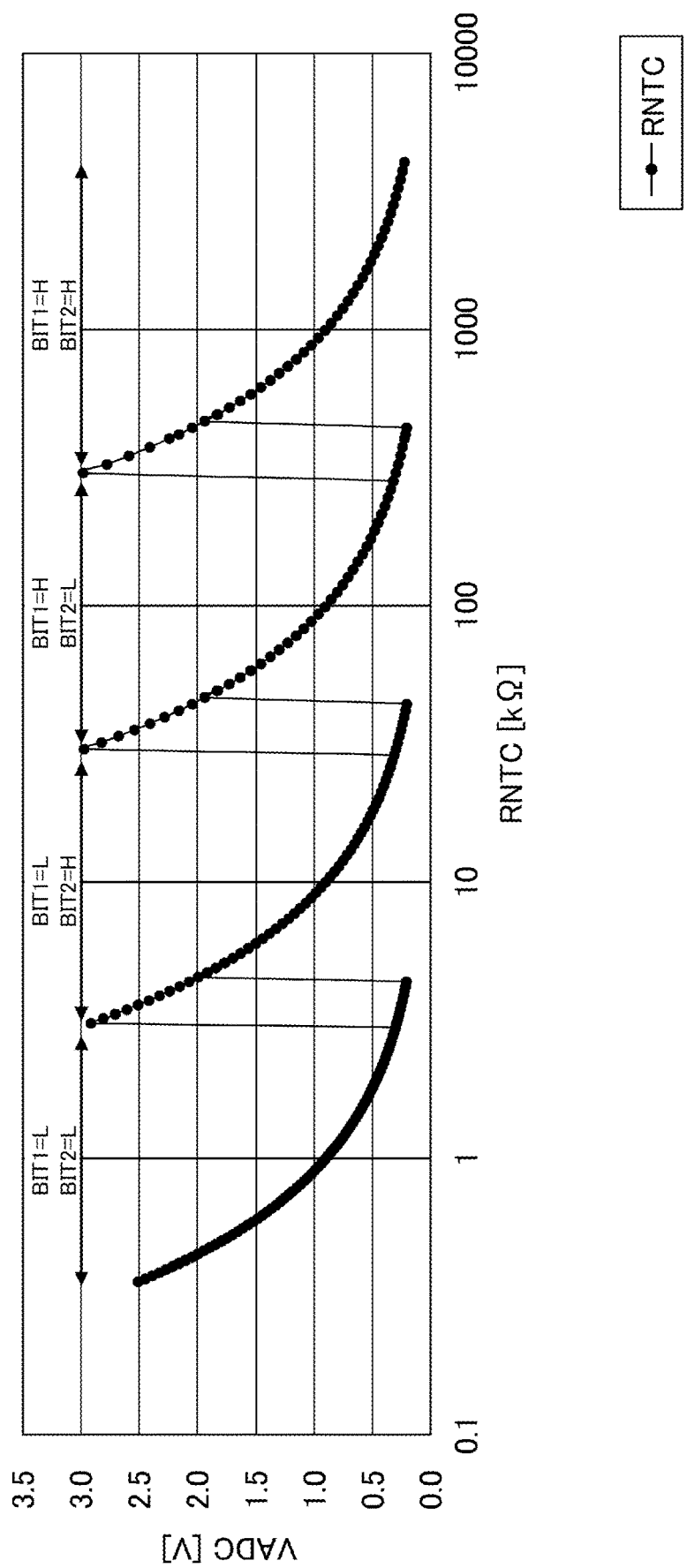
FIG. 3 is a diagram illustrating an example of a change characteristic of a voltage level VADC with respect to a resistance value RNTC of a temperature sensitive element.

FIG. 3 is a diagram illustrating an example of the change characteristic of the voltage level VADC with respect to the resistance value RNTC of the temperature sensitive element 60. In the temperature measurement circuit 101, as illustrated in FIG. 3, the voltage level VADC exhibits the change characteristic with changes in the resistance value RNTC, for the logic level of each of the first information BIT1 and the second information BIT2. The temperature measurement circuit 101 employs a system that detects changes in the current that flows through the temperature sensitive element 60. With this arrangement, the circuit constant of the voltage control circuit 20 or the like of the temperature measurement circuit 101 can be set without depending on a constant of the temperature sensitive element 60. With this arrangement, a wide range of constants of the temperature sensitive element can be used without changing the circuit constant of the voltage control circuit 20 or the like. That is, the temperature measurement circuit 101 can measure the wide range of resistance values RNTC, with high accuracy. Therefore, for example, the temperature measurement circuit 101 may use multiple types of temperature sensitive elements 60 each having a different temperature characteristic for a resistance value. The external device can calculate the temperature with high accuracy, based on (i) a given measurement value (voltage level VADC or a value corresponding to the voltage level VADC), (ii) the first information BIT1, and (iii) the second information BIT2. Further, in contrast to a circuit configuration described in Patent Document 1, the temperature measurement circuit 101 does not have the circuit configuration in which when the temperature sensitive element 60 operates in a low resistance range, the resistance value of a given resistor coupled in series with the temperature sensitive element 60 is reduced. Thus, in the temperature measurement circuit 101, increases in the current flowing into the temperature sensitive element 60 can be reduced.

Figure 4:
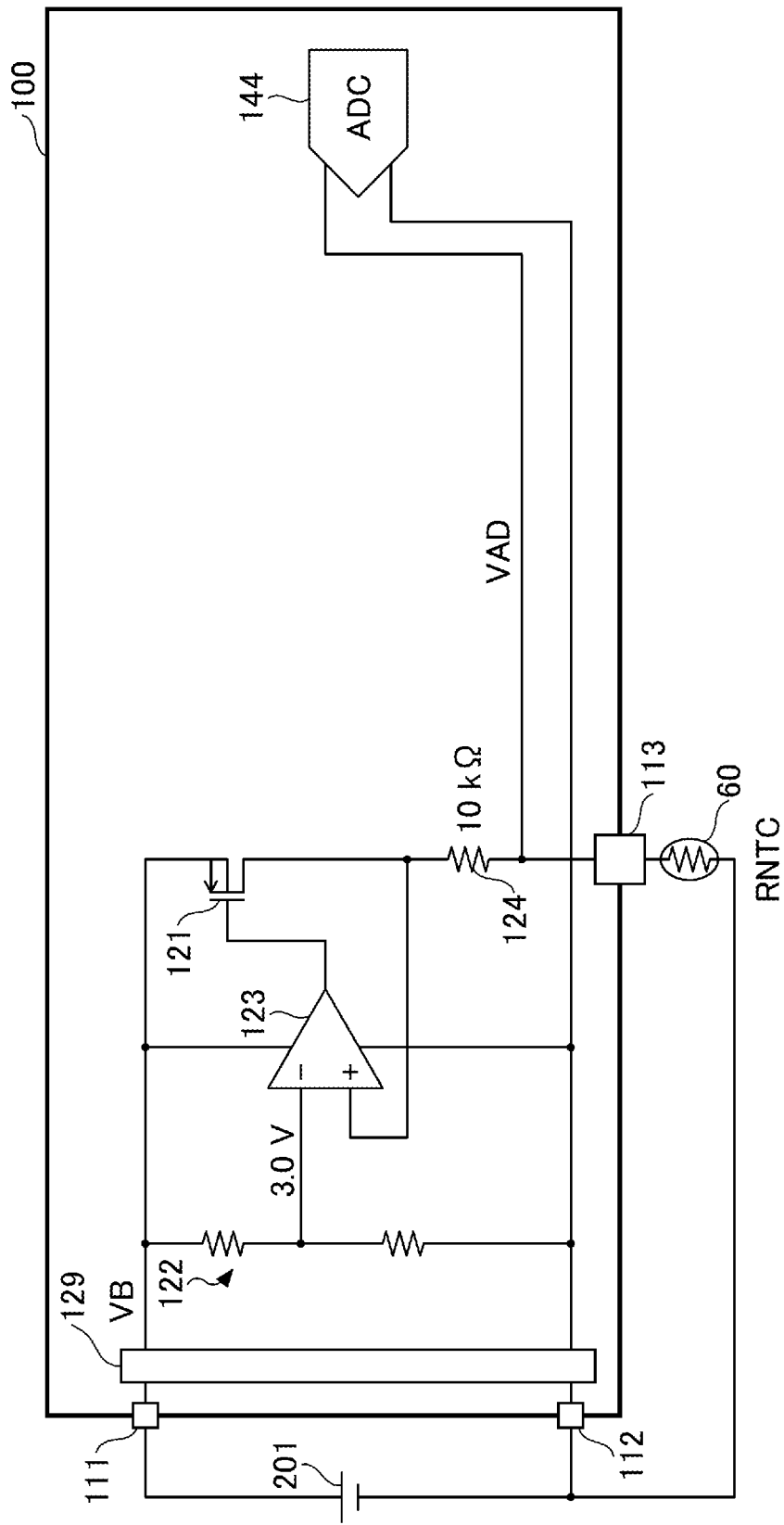
FIG. 4 is a diagram illustrating the configuration of the temperature measurement circuit in a comparative example.

FIG. 4 is a diagram illustrating an example of the configuration of the temperature measurement circuit in a comparative example. The temperature measurement circuit 100 illustrated in FIG. 4 measures the temperature of a measurement target by using the temperature sensitive element 60. The temperature measurement circuit 100 differs from the temperature measurement circuit 101 according to the first embodiment in that the temperature measurement circuit 100 includes a resistor 124 coupled in series with the temperature sensitive element 60 and outputs a voltage level VAD from a connection point of the resistor 124 and the temperature sensitive element 60.

A terminal 111 is a power supply terminal, and a terminal 112 is a ground terminal. A positive electrode of a power supply 201, such as a secondary battery, is electrically coupled to the terminal 111. A negative electrode of the power supply 201 is electrically coupled to the terminal 112. The temperature measurement circuit 100 operates with a supply voltage between the terminals 111 and 112, where the supply voltage is applied by the power supply 201. For example, the temperature measurement circuit 100 operates with the voltage VB that is generated by a constant voltage source 129 such as a regulator. A terminal 113 is a temperature measurement terminal to be coupled to one end of the temperature sensitive element 60. The one end of the temperature sensitive element 60 is coupled to the terminal 113, and another end is coupled to the terminal 112.

The temperature measurement circuit 100 includes a reference voltage circuit 122, a differential circuit 123, a transistor 121, the resistor 124, and an AD converter 144.

The reference voltage circuit 122 generates a reference voltage Vr (in this example, 3.0 V). The differential circuit 123 controls a gate voltage for the transistor 121 such that a difference between a constant voltage, which is applied across a series circuit including the temperature sensitive element 60 and the resistor 124, and the reference voltage Vr, which is generated by the reference voltage circuit 122, is zero.

Figure 5:
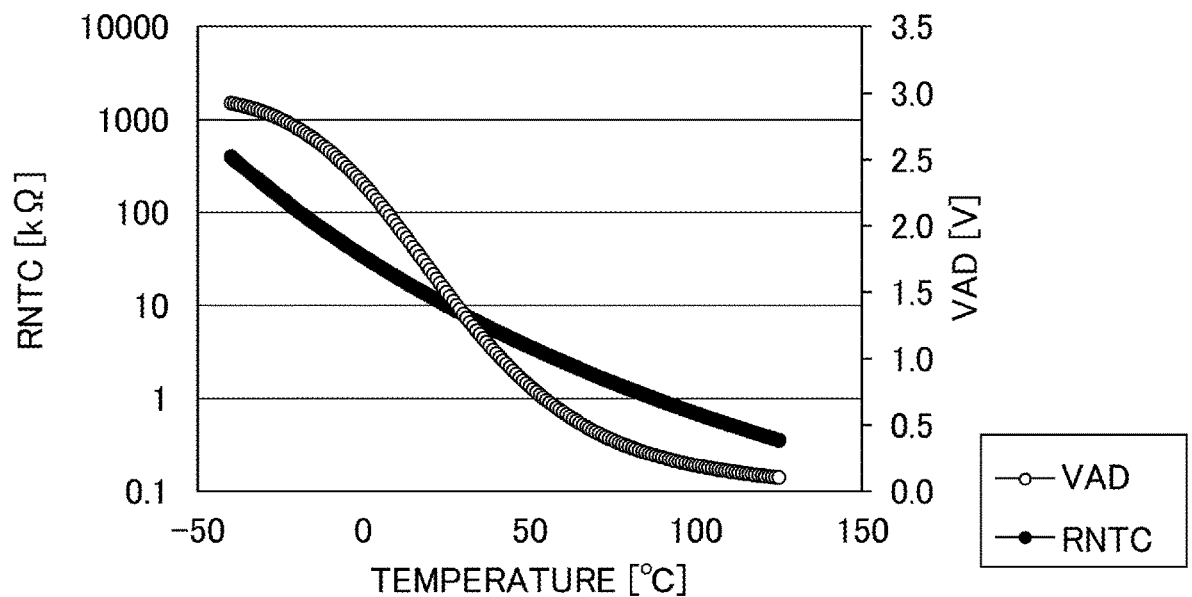
FIG. 5 is a diagram illustrating an example of the change characteristic of a voltage level VAD measured by the temperature measurement circuit that uses the temperature sensitive element of which the resistance value RNTC is 10 KΩ at an atmospheric temperature of 25° C. in the comparative example.
Figure 6:
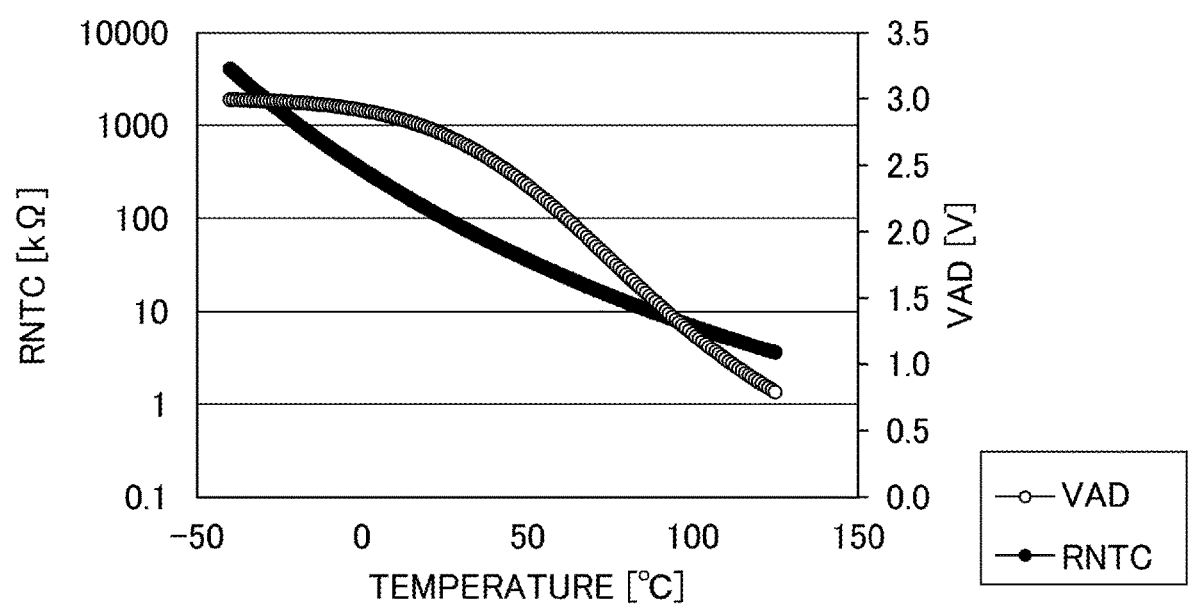
FIG. 6 is a diagram illustrating an example of the change characteristic of the voltage level VAD measured by the temperature measurement circuit that uses the temperature sensitive element of which the resistance value RNTC is 100 KΩ at the atmospheric temperature of 25° C. in the comparative example.

FIG. 5 is a diagram illustrating an example of the change characteristic of the voltage level VAD measured by the temperature measurement circuit 100 that uses the temperature sensitive element of which the resistance value RNTC is 10 kΩ at an atmospheric temperature of 25° C. in the comparative example. FIG. 6 is a diagram illustrating an example of the change characteristic of a voltage level VAD measured by the temperature measurement circuit 100 that uses the temperature sensitive element of which the resistance value RNTC is 100 kΩ at the atmospheric temperature of 25° C. in the comparative example.

In FIGS. 5 and 6, small changes in the voltage level VAD in accordance with changes in the temperature (resistance value RNTC) indicate less sensitivity (accuracy) in measuring temperatures. In FIG. 5, although measurement accuracy at around 25° C. is relatively good, measurement accuracy in a high temperature range and a low temperature range is reduced. In FIG. 6, in a low temperature range, changes in the voltage level VAD are negligible, and thus measurement accuracy is reduced. Because the temperature measurement circuit 100 in the comparative example employs a system that detects changes in the voltage that is divided through the temperature sensitive element 60 and the resistor 124, the constant of the temperature sensitive element 60 and the constant of the resistor 124 need to correspond to each other in one-to-one relation, and thus the constant of the temperature sensitive element 60 cannot be changed as needed. With this arrangement, in the temperature measurement circuit 100 in the comparative example, the resistance value of the resistor 124 in the comparative example needs to be changed depending on the characteristic of the temperature sensitive element 60 or a temperature range.

Figure 7:
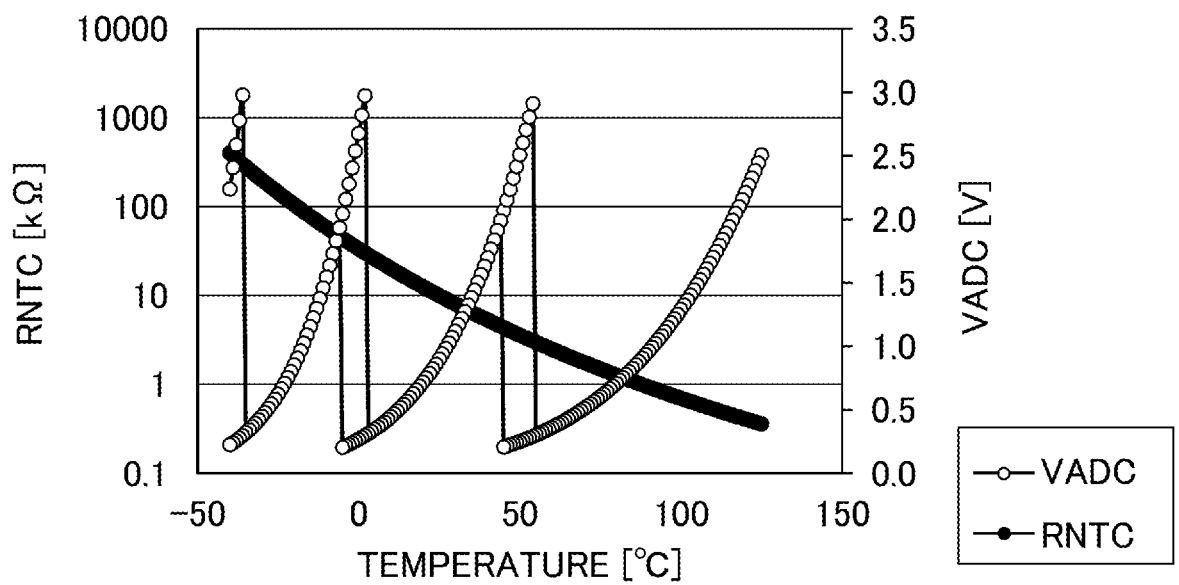
FIG. 7 is a diagram illustrating an example of the change characteristic of the voltage level VADC measured by the temperature measurement circuit that uses the temperature sensitive element of which the resistance value RNTC is 10 KΩ at the atmospheric temperature of 25° C. according to one embodiment.
Figure 8:
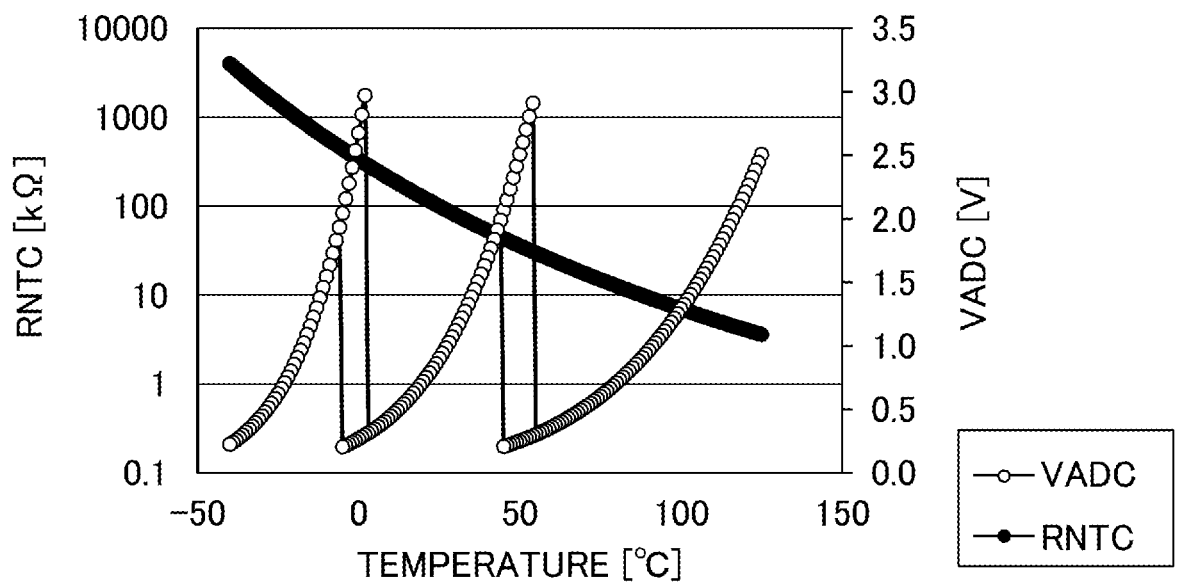
FIG. 8 is a diagram illustrating an example of the change characteristic of the voltage level VADC measured by the temperature measurement circuit that uses the temperature sensitive element of which the resistance value RNTC is 100 kΩ at the atmospheric temperature of 25° C. according to one embodiment.

FIG. 7 is a diagram illustrating an example of the change characteristic of the voltage level VADC measured by the temperature measurement circuit 101 that uses the temperature sensitive element of which the resistance value RNTC is 10 kΩ at the atmospheric temperature of 25° C. according to one embodiment. FIG. 8 is a diagram illustrating an example of the change characteristic of the voltage level VADC measured by the temperature measurement circuit 101 that uses the temperature sensitive element of which the resistance value RNTC is 100 kΩ at the atmospheric temperature of 25° C. according to one embodiment.

As illustrated in FIGS. 7 and 8, in the temperature measurement circuit 101, the voltage level VADC changes greatly in accordance with changes in the temperature (resistance value RNTC), and thus sensitivity (accuracy) in measuring the temperature is improved. Because the temperature measurement circuit 101 according to one embodiment employs a system that detects changes in the current that flows through the temperature sensitive element 60, the circuit constant of the voltage control circuit 20 or the like of the temperature measurement circuit 101 can be set without depending on the constant of the temperature sensitive element 60. With this arrangement, a wide range of constants of the temperature sensitive element can be used without changing the circuit constant of the voltage control circuit 20 or the like. Further, in the temperature measurement circuit 101 according to one embodiment, a wide range of changes in the resistance value RNTC can be measured, and thus multiple types of temperature sensitive elements each having a different temperature characteristic for the resistance value can be used.

Although one or more embodiments have been described, the present disclosure is not limited to the embodiments. Various modifications and changes, such as combinations and substitutions with some or all of other embodiments, can be made.

For example, the temperature measurement circuit is not limited to an integrated circuit, and may be a discrete circuit that is constituted by multiple discrete components. An object of which the temperature is to be measured includes a solid, a liquid, or gas. The temperature sensitive element may include an element other than the NTC thermistor.

What is claimed is:

1. A temperature measurement circuit for measuring a temperature using a temperature sensitive element, the temperature measurement circuit comprising:
    a voltage control circuit configured to apply a control voltage to the temperature sensitive element;
    a first switching circuit configured to switch levels of the control voltage based on a current flowing through the temperature sensitive element;
    a conversion circuit configured to convert the current flowing through the temperature sensitive element into a voltage level corresponding to the measured temperature, by using predetermined conversion gain; and
    a second switching circuit configured to switch values of the conversion gain based on the voltage level.

2. The temperature measurement circuit according to claim 1, wherein the voltage control circuit includes a transistor for driving the temperature sensitive element, the voltage control circuit being configured to apply the control voltage to the temperature sensitive element, through the transistor.

3. The temperature measurement circuit according to claim 2, wherein the voltage control circuit is configured to apply the control voltage to the temperature sensitive element by comparing the control voltage against a reference voltage and controlling a gate of the transistor.

4. The temperature measurement circuit according to claim 3, further comprising a differential circuit configured to compare the control voltage against the reference voltage, wherein the voltage control circuit is configured to apply the control voltage to the temperature sensitive element by controlling the gate of the transistor based on an output of the differential circuit.

5. The temperature measurement circuit according to claim 3, wherein the first switching circuit is configured to switch the levels of the control voltage by switching levels of the reference voltage based on a current flowing through the transistor.

6. The temperature measurement circuit according to claim 5, wherein the first switching circuit is configured to switch the levels of the reference voltage such that a level of the control voltage is reduced to a first voltage level, when a magnitude of the current flowing through the transistor rises above a first current threshold, and switch the levels of the reference voltage such that the level of the control voltage is increased to a second voltage level greater than the first voltage level, when the magnitude of the current flowing through the transistor falls below a second current threshold.

7. The temperature measurement circuit according to claim 5, further comprising a first current mirror circuit configured to output a first mirror current in accordance with the current flowing through the transistor, wherein the first switching circuit is configured to switch the levels of the reference voltage based on the first mirror current output from the first current mirror circuit.

8. The temperature measurement circuit according to claim 2, wherein the first switching circuit is configured to switch the levels of the control voltage based on the current flowing through the transistor.

9. The temperature measurement circuit according to claim 8, wherein the first switching circuit is configured to change a level of the control voltage to a first voltage level, when a magnitude of the current flowing through the transistor rises above a first current threshold, and change the level of the control voltage to a second voltage level greater than the first voltage level, when the magnitude of the current flowing through the transistor falls below a second current threshold.

10. The temperature measurement circuit according to claim 8, further comprising a first current mirror circuit configured to output a first mirror current in accordance with the current flowing through the transistor, wherein the first switching circuit is configured to switch the levels of the control voltage based on the first current mirror current output from the first current mirror circuit.

11. The temperature measurement circuit according to claim 2, further comprising a second current mirror circuit configured to perform conversion of a current flowing through the transistor, wherein the conversion circuit is configured to generate the voltage level based on the conversion through the second current mirror circuit.

12. The temperature measurement circuit according to claim 11, wherein the conversion circuit includes a resistor, and wherein the conversion circuit is configured to convert the current flowing through the transistor into a second mirror current, through the second current mirror circuit, and generate the voltage level by passing the second mirror current into the resistor.

13. The temperature measurement circuit according to claim 12, wherein the conversion circuit includes an analog-to-digital converter configured to convert, into a digital value, an analog value indicating the voltage level generated by passing the second mirror current into the resistor.

14. The temperature measurement circuit according to claim 2, wherein an output terminal of the transistor is electrically coupled to one end of the temperature sensitive element.

15. A temperature measurement device comprising:

the temperature measurement circuit according to claim 1; and the temperature sensitive element.

16. The temperature measurement circuit according to claim 1, wherein the second switching circuit is configured to switch the values of the conversion gain based on the voltage level, such that the voltage levels are set in a predetermined range.

17. The temperature measurement circuit according to claim 1, wherein the second switching circuit is configured to change a value of the conversion gain to a first conversion gain value, when the voltage level rises above a first threshold, and change the value of the conversion gain to a second conversion gain value greater than the first conversion gain value, when the voltage level falls below a second threshold.

18. The temperature measurement circuit according to claim 1, further comprising a first output terminal for outputting first information to outside of the temperature measurement circuit, the first information changing in accordance with a level of the control voltage, and a second output terminal for outputting second information to the outside of the temperature measurement circuit, the second information changing in accordance with a value of the conversion gain.

19. A temperature measurement circuit for measuring a temperature using a temperature sensitive element, the temperature measurement circuit comprising:

a transistor for driving the temperature sensitive element;

a differential circuit configured to compare an output voltage of the transistor against a reference voltage;

a voltage control circuit configured to apply a control voltage to the temperature sensitive element by controlling a gate of the transistor based on an output of the differential circuit; and a conversion circuit configured to convert an output current of the transistor into a voltage level corresponding to the measured temperature, wherein the output voltage of the transistor is a voltage into which the output current of the transistor is converted based on a resistance value of the temperature sensitive element.

20. The temperature measurement circuit according to claim 19, wherein levels of the reference voltage are switched based on the output current of the transistor.

* * * * *